Jan. 30, 1945. H. O. PETERSON 2,368,566
TRANSMISSION LINE SEAL AND INSULATOR
Original Filed Dec. 23, 1939
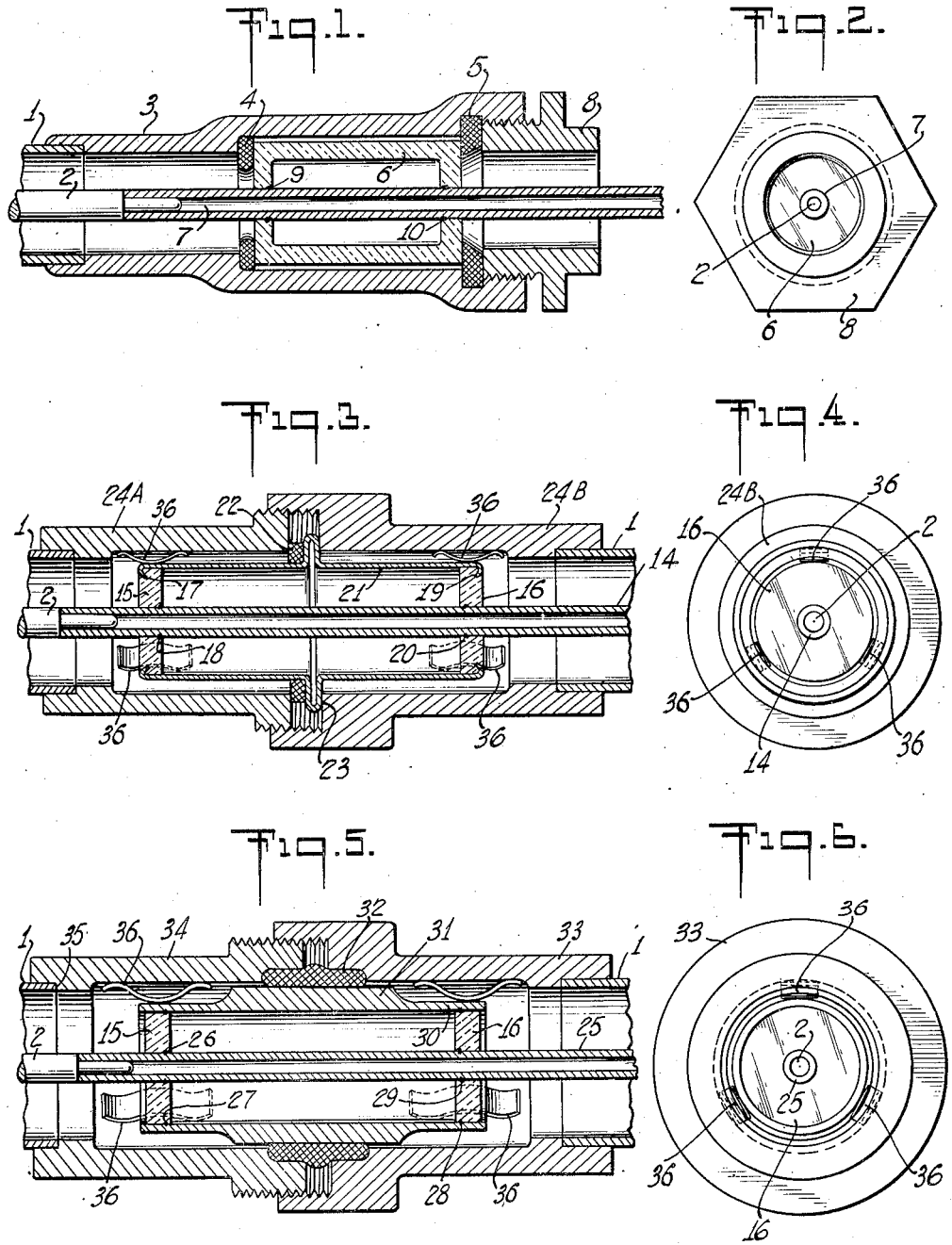
INVENTOR
HAROLD O. PETERSON.
BY
H. S. Snover
ATTORNEY Patented Jan. 30, 1945

2,368,566

UNITED STATES PATENT OFFICE 2,368,566

TRANSMISSION LINE SEAL AND INSULATOR

Harold O. Peterson, Riverhead, N. Y., assignor to Radio Corporation of America, a corporation of Delaware Original application December 23, 1939, Serial No. 310,807. Divided and this application August 29, 1942, Serial No. 456,631

11 Claims. (Cl. 174—22)

This invention relates to a new and novel transmission line seal.

An object of this invention is to simplify and improve transmission lines generally in order to provide a combined transmission line seal and insulator which will reduce high voltage electrical brushing by having a minimum amount of metal and solid dielectric in the active electric field.

Another object is to provide a transmission line seal which will not cause reflections and standing waves when the line is used to transmit high frequency energy.

Still another object of this invention is to improve a transmission line coupling or terminating seal which is suitable for use in transmission lines of the coaxial type.

This application is a divisional application of my copending parent application, Serial No. 310,807, filed December 23, 1939, which is now matured into United States Patent 2,331,136 and contains claims directed to Figs. 1 and 2 of the drawing, whereas this application contains claims directed to Figs. 3, 4, 5 and 6.

A feature of this invention is the novel combination of an insulating and a gas-tight sealing member to space the inner conductor concentric with the outer conductor and to completely seal the line from fluid leakage.

Coaxial transmission lines are generally operated in such a manner as to have an internal gas pressure greater than atmospheric pressure or outside hydrostatic pressure so that if there are any small leaks in the system, gas will slowly escape rather than have a condition of moist air or water being forced into the line. Dry nitrogen is commonly used in these lines but any inert dry gas is generally satisfactory. At the ends of the line it is generally necessary to provide a termination for connecting the transmission line with apparatus operating at atmospheric pressure and, consequently, a gas-tight seal may be provided to prevent escape of gas from the line. Many of the seals commonly used in practice have such large capacity that they are not satisfactory for operation at ultra-high frequencies. The invention provides a seal with good insulating qualities and a very small electrical capacity, also, the design is such that good mechanical strength is obtained.

This invention will best be understood by referring to the accompanying drawing, in which:

Fig. 1 is a longitudinal section of an all glass seal and insulator of this invention;

Fig. 2 is an end elevation of Fig. 1;

Fig. 3 is a longitudinal section of a combined glass and metal seal;

Fig. 4 is an end elevation of Fig. 3;

Fig. 5 is a longitudinal section of a modification of the seal shown in Figs. 3 and 4, and Fig. 6 is an end elevation of Fig. 5.

Referring now in detail to the drawing, Figs. 1 and 2 show a seal applied to the end of a concentric line which consists of an inner conductor 2 and an outer concentric conductor 1. The outer conductor 1 is generally in the form of a metallic pipe and is soldered to a female fitting 3 which may be of brass or other suitable metal having good electrical conductivity. The inner conductor 2 is soldered to a piece of thin tubing 7 which has the same outside diameter as conductor 2. This tubing may be of a metal known in the trade as "Fernico" or other suitable metal, such that it can be bonded with a cylindrical glass insulating member 6 which is in the form of a cylindrical tube with the ends closed down to a smaller diameter and bonded to the metal tubing 7 at points 9 and 10. This bonding is the usual type of glass-to-metal seal commonly used in vacuum tube practice in which the immediate contact area of the glass is heated to a temperature gradient sufficient to wet the metal tube 7.

At each end of the cylindrical glass insulating member there is located gas-tight gaskets 4 and 5 which may be of rubber or other suitable material. The necessary compression to make gaskets 4 and 5 fluid-tight is obtained by tightening the threaded hex nut 8, which is also preferably made of brass. Thus, with the gas-tight gaskets 4 and 5 and the glass-to-metal seals 9 and 10, the gas pressure in the concentric line is retained by a double set of gas-tight barriers. Because of the fact that the metal conductor 7 is supported at two points, a good degree of mechanical strength will also be realized. By keeping the wall thickness of the insulating member 6 substantially less than its radius the amount of solid dielectric in the active electric field is greatly reduced and therefore reduces dielectric losses in the transmission line.

The seal shown by Figs. 3 and 4 is generally similar to that shown in Figs. 1 and 2, except in this case the insulating member includes two glass discs 15 and 16 which are sealed to an inner conductor 14 at points 18 and 20 and to an outer cylinder 21, of metal, at points 17 and 19. At the central portion of member 21, a flange 23 is provided so that the sealing device can be clamped with suitable packing material at 22 so as to complete the gas-tight seal. The packing material 22 is clamped between male and female fittings 24a and 24b, respectively. It will also be desirable at very high frequencies to make electrical contact between the outside of the outer metal shell of the seal and the inside of the outer conductor of the line. To accomplish this, there is provided a plurality of metal spring contact members 36 which are secured to member 21 to contact the inside of members 24A and 24B.

In the other embodiment shown by Figs. 5 and 6, the insulating member includes an inner conductor tube 25 which is sealed to glass discs 15 and 16 at points 26 and 29. These discs are likewise sealed to an outer cylindrical member 30, also of metal, at points 27 and 28. This outer cylinder is thickened at one or more points, such as, for instance, at 31, to allow it to be firmly clamped in a gas-tight compression seal by clamping the gasket 32 between the female fitting 33 and the male fitting 34, the latter being soldered to the outer conductor 1 at point 35. A plurality of spring members 36 are secured to tube 30 by any suitable means, such as for example by welding, and make contact with the inside of members 33 and 34.

The inner conductors, shown as members 7, 14 and 25, may be of any suitable metallic tubing which are copper or silver plated to improve their conductivity at radio frequencies. The insulation discs shown as members 15 and 16 are preferably made of inorganic material, but this material need not necessarily be that of glass. For example, a platinized porcelain disc might be used which is platinized at outer and inner circumferences, in which case it would be possible to solder the disc into the metal cylinder and also to the inner conductor. Members 8, 24b and 33 may connect to suitable terminal means or join another length of inner and outer conductors.

Although only a few embodiments of this invention are shown, it is to be distinctly understood that it should not be limited precisely thereto.

I claim:

1. A fluid-tight radio frequency transmission line arrangement comprising inner and outer conductors concentrically arranged with coupling members for joining two portions of said outer conductor together, one of said coupling members having an end clamping means, an insulating member including two insulating disc members secured to and sealed to a metallic portion of the inner conductor of said line, a metallic tube having a portion of increased diameter, said metallic tube having its ends sealed to the outer portion of each of said insulating disc members, clamping means on another one of said coupling members whereby the increased diameter portion of said metallic tube and the coupling member having end clamping means are joined together, and a fluid-tight gasket interposed between the portion of increased diameter of said metallic tube and at least one of said coupling members.

2. A radio frequency transmission line comprising an inner and an outer conductor concentrically arranged, coupling members for connecting two portions of said outer conductor together, an insulating member including two ceramic disc members secured and sealed to a metallic portion of the inner conductor of said line, a metallic tube having a narrow central portion of increased wall thickness, said metallic tube having its ends sealed to the outer portions of said ceramic disc members, clamping means on one end of said coupling members whereby the increased wall thickness portion of said metallic tube and the two coupling members of the outer conductor of said line are joined together, and a fluid-tight gasket interposed between the narrow portion of increased wall thickness of said metallic member and the end clamping means of at least one of said coupling members.

3. A radio frequency transmission line comprising an inner and outer conductor concentrically arranged, an insulating member including end insulators joined by an outer metallic tube all forming a fluid-tight seal, said insulating member secured and sealed to a metallic member forming a portion of the inner conductor of said line, two coupling members having threaded ends, each one being secured to an end of an outer conductor, one threaded end of said coupling members being adapted to be threaded into the threaded end of the other coupling member, and a fluid-tight gasket interposed between the threaded ends of said coupling members and the central portion of the outer metallic tube of said insulating member.

4. A radio frequency transmission line comprising inner and outer conductors concentrically arranged, a fluid-tight seal comprising an insulating member including ceramic end insulators and an outer metallic tube, a metallic tube sealed to said insulating member, said metallic tube forming a portion of the inner conductor and connected thereto, two coupling members having threaded ends, each one of which is secured to an end of an outer conductor, a threaded end of one of said coupling members being adapted to be threaded into the end of the other coupling member, and a fluid-tight gasket interposed between the threaded ends of said coupling member and the central portion of said outer metallic tube of said insulating member.

5. A radio frequency transmission line comprising an inner and an outer conductor, a first metallic tube forming a portion of the inner conductor of said line, insulating means including two ceramic disc members secured and sealed to said first tube, a second metallic tube having each of its ends sealed to the peripheries of said ceramic discs, clamping means for joining two portions of the outer conductor of said line together, and a gasket interposed between the outside of said second metallic tube, and said clamping means, for providing a fluid-tight joint for said line.

6. A radio frequency transmission line comprising an inner and an outer conductor concentrically arranged, a first metallic tube forming a portion of said inner conductor, insulating means including two ceramic discs having their central portion secured and sealed to a portion of said first tube, a second metallic tube having a wall which is substantially thin with respect to the thickness of said ceramic disc members, said second metallic tube having each of its ends sealed to the outside ends of said ceramic discs, clamping means for joining two portions of the outer conductor of said line together, and a fluid-tight gasket interposed between the central portion of the outside of said second metallic tube and said clamping means.

7. A radio frequency transmission line comprising an inner and an outer conductor concentrically arranged, a metallic cylindrical member forming a portion of said inner conductor, insulating means including two ceramic disc members secured and sealed to a portion of said cylindrical member, a metallic tube having a portion of increased wall thickness sealed to said ceramic disc members, clamping means for joining two portions of the outer conductor of said line together, a fluid-tight gasket interposed between the increased wall thickness of said metallic tube and a portion of the clamping means for said outer conductor, and a plurality of spring members secured to said metallic tube of increased wall thickness for contacting the inside of the outer conductor.

8. A radio frequency transmission line having an inner and an outer conductor concentrically arranged, comprising a first metallic tube forming a portion of the inner conductor, insulating means including two ceramic disc members of insulation material secured and sealed to a portion of said first metallic tube, a second metallic tube having a central portion of increased wall thickness sealed to said ceramic disc members, clamping means for joining two portions of the outer conductor of said line together, a fluid-tight gasket interposed between the portion of increased wall thickness of said second metallic tube and a portion of the clamping means for said outer conductor, and a plurality of spring members secured to both ends of said second metallic tube for contacting the inside of the outer conductor.

9. A radio frequency transmission line fluid-tight seal comprising inner and outer conductors concentrically arranged with terminal members for connecting to the ends of the outer conductors, said terminal members each having an end clamping means, an insulating member including two insulating disc members secured to and sealed to a metallic portion forming a continuation of the inner conductor of said line, a metallic tube having a narrow portion of increased diameter, said metallic tube having its ends sealed to the outer portions of said insulating disc members, the clamping means of said terminal member being arranged for engaging the increased diameter portion of said metallic tube and also to join said terminal members together, and a fluid-tight gasket interposed between the increased diameter portion of said metallic tube and said clamping means.

10. A radio frequency transmission line comprising an inner and an outer conductor concentrically arranged, a terminal member for connecting to an end of said outer conductor, an insulating member including two ceramic disc members secured and sealed to a metallic portion of the inner conductor of said line, a metallic tube having a central portion of increased diameter, said metallic tube having its ends sealed to the outer portion of said ceramic disc members, clamping means on said terminal member to clamp the central portion of said metallic tube and for joining two clamping portions of the outer conductor of said line together, and a fluid-tight gasket interposed between the central portion of said metallic tube and the clamping means of said terminal member.

11. A radio frequency transmission line comprising an inner and an outer conductor concentrically arranged, a first metallic tube forming a portion of said inner conductor, insulating means including two ceramic disc members secured and sealed to a portion of said first tube, a second metallic tube having a portion of increased wall thickness sealed to said ceramic disc members, clamping means for joining two portions of the outer conductor of said line together, a fluid-tight gasket interposed between the increased wall thickness of said second metallic tube and a portion of the clamping means for said outer conductor.

HAROLD O. PETERSON.